No. 646,197. Patented Mar. 27, 1900.
H. T. VADERS.
MOTOR.
(Application filed Dec. 7, 1899.)
(No Model.) 3 Sheets—Sheet 2.

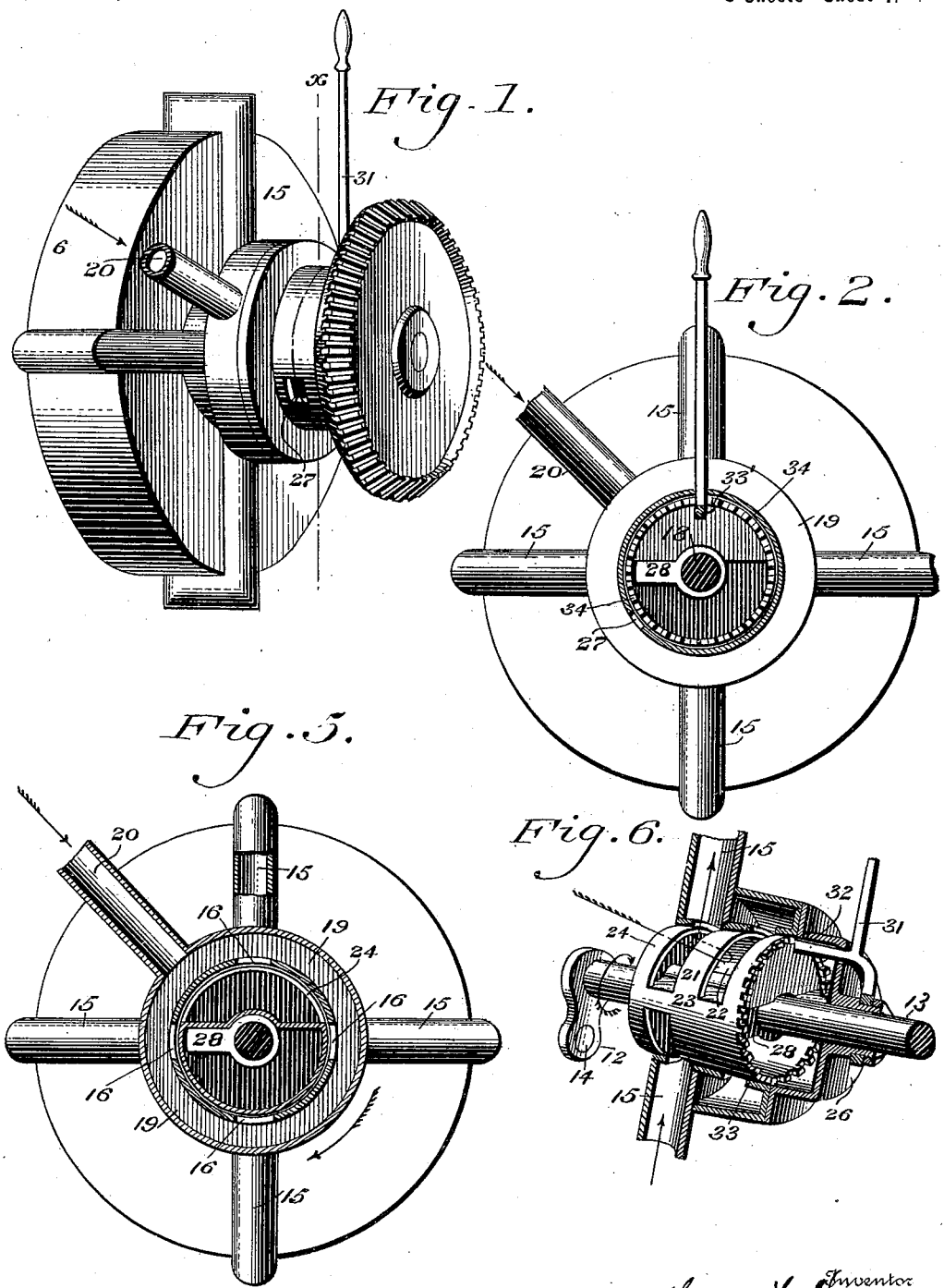

Witnesses
Inventor
Henry T. Vaders
Wiederheim & Fairbanks
Attorneys

No. 646,197. Patented Mar. 27, 1900.
H. T. VADERS.
MOTOR.
(Application filed Dec. 7, 1899.)

(No Model.) 3 Sheets—Sheet 3.

Witnesses
P. F. Eagle.
L. Dorville.

Inventor
Henry T. Vaders,
By Wiedersheim & Fairbanks
Attorneys

UNITED STATES PATENT OFFICE.

HENRY T. VADERS, OF PHILADELPHIA, PENNSYLVANIA.

MOTOR.

SPECIFICATION forming part of Letters Patent No. 646,197, dated March 27, 1900.

Application filed December 7, 1899. Serial No. 739,528. (No model.)

*To all whom it may concern:*

Be it known that I, HENRY T. VADERS, a citizen of the United States, residing in the city and county of Philadelphia, State of Pennsylvania, have invented a new and useful Improvement in Motors, which improvement is fully set forth in the following specification and accompanying drawings.

This invention consists of a novel construction in a motor that is adapted for use with steam, compressed air, or the like as a propelling medium, as will be hereinafter fully described and claimed.

Figure 3:
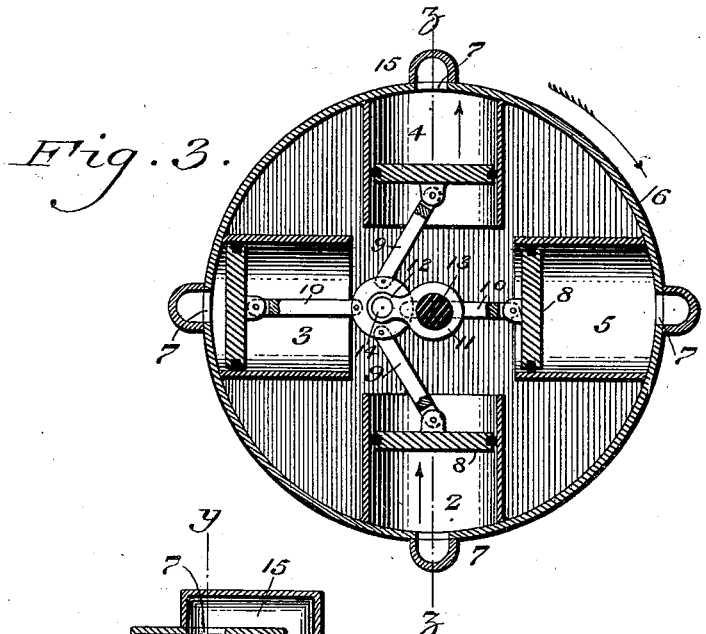
Figure 4:
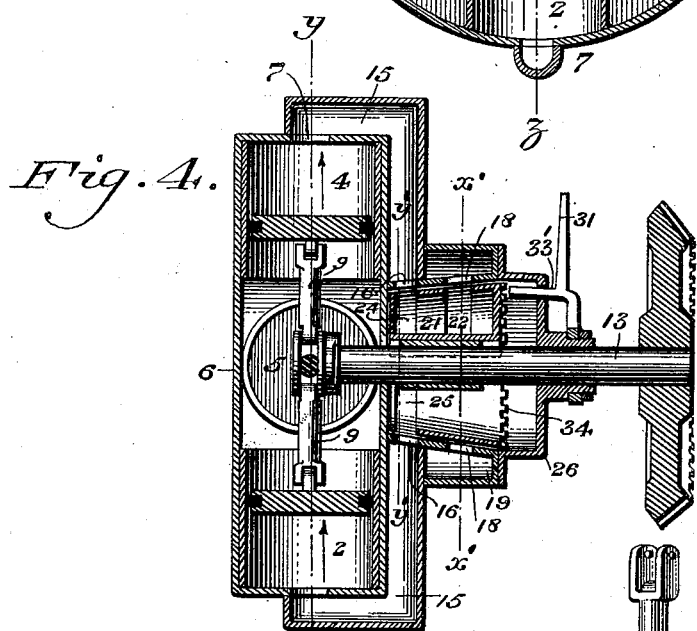
Figure 7:
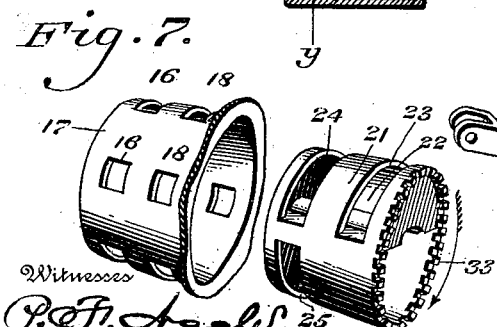
Figure 12:
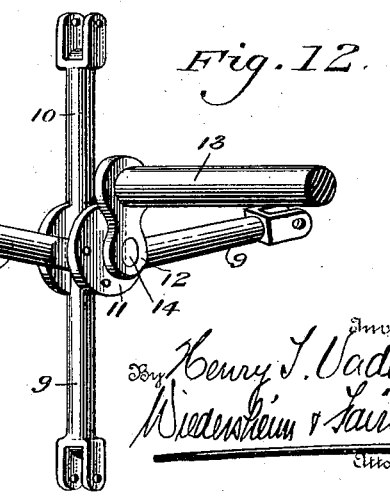
Figure 8:
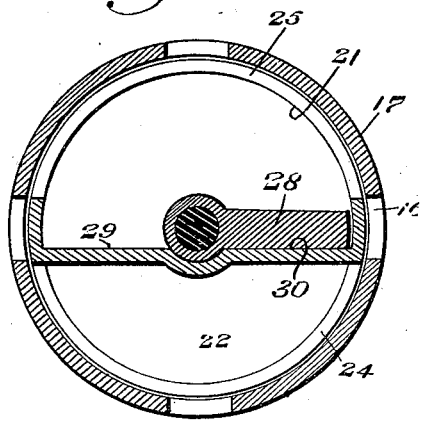
Figure 10:
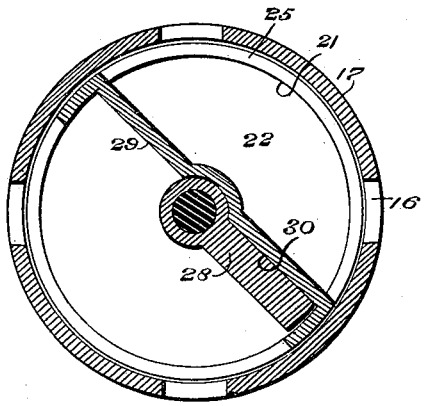
Figure 9:
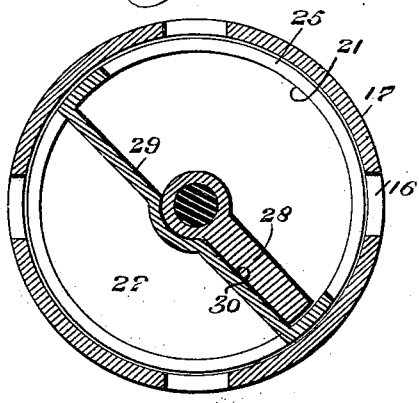
Figure 11:
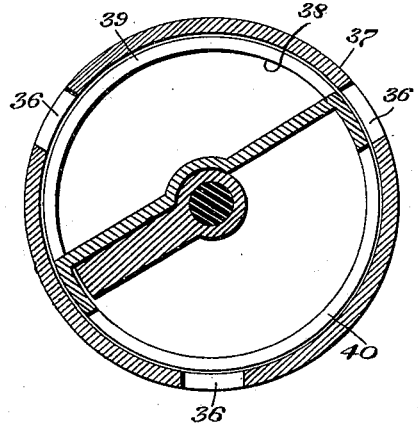

Figure 1 represents a perspective view of a motor constructed in accordance with my invention. Fig. 2 represents a vertical transverse section taken on line $xx$, Fig. 1. Fig. 3 represents a vertical transverse section taken on line $yy$, Fig. 4, the piston-rods and their connection with the main shaft being shown in elevation. Fig. 4 represents a central longitudinal section taken partially on line $zz$, Fig. 3, and showing two of the piston-rods and their connections with the main shaft in elevation. Fig. 5 represents a vertical transverse section taken on line $x'x'$, Fig. 4. Fig. 6 represents a perspective view, partially broken away, of the valve for controlling the cylinder inlet and exhaust ports. Fig. 7 represents a perspective view of the valve and its casing in detail. Fig. 8 represents a sectional detail of the valve and valve-casing, taken on the line $y'y'$, Fig. 4, and showing the valve in the position it assumes when the pistons are in the position shown in Figs. 3 and 4. Fig. 9 represents a similar view showing the valve after it is rotated an eighth of a revolution from the position shown in Fig. 8. Fig. 10 represents a similar view showing the position of the valve after being reversed from the position shown in Fig. 9. Fig. 11 represents a similar view of a valve and its casing arranged for use in connection with three cylinders. Fig. 12 represents a perspective view of a novel form of piston-rod used in connection with this motor.

Similar numerals of reference indicate corresponding parts in the figures.

Referring to the drawings, 1 designates a motor having a plurality of cylinders 2, 3, 4, and 5, inclosed within and mounted upon the casing 6. The inlet and exhaust ports 7 of these cylinders are situated at their outer ends, the inner ends of the cylinders being open. The cylinders are provided with pistons 8, the piston-rods 9 and 10 of which are connected with a head 11, that is connected by means of a crank-arm 12 with the main shaft 13 of the motor. With the exception of Fig. 11 the motor illustrated is provided with four cylinders, and I will describe the same with particular reference thereto. The said pistons are adapted to act successively to rotate the main shaft 13, and the arrangement of the piston-rods connecting the same with said shaft is constructed as follows: The piston-rod 10 and head 11 are rigidly connected, while the inner ends of the piston-rods 9 are pivoted thereto conveniently between the side plates of said head 11. The crank-arm 12, rigid with the main shaft, is pivoted to the head 11, for instance, upon the wrist-pin 14. In this way it is seen that the movement of the piston is communicated to the driving-shaft to continuously rotate the same, the rigid connection between the piston-rod 10 and head 11 being employed to avoid lost motion between said parts.

The cylinder-ports 7, which act both for feed and exhaust, communicate by means of feed pipes 15 with the combined feed and exhaust ports 16 of the valve casing or seat 17, four of these ports 16 being employed and being equally disposed around said valve seat or casing conveniently at the inner end thereof or the end adjacent the casing 6. The said valve casing or seat 17 is provided near its outer end with another series of inlet-ports 18, corresponding to the combined inlet and exhaust ports 16. An annular chamber 19 surrounds the casing or valve seat 17 and communicates with said ports 18, and the main supply-pipe 20 communicates with said chamber 19. The valve 21 rotates within said valve-seat 17 and is provided with a chamber 22, extending from end to end and on one side thereof. At the outer end of the valve and in alinement with the ports 18 of the valve-seat is a port 23, communicating with this chamber 22, while at the other end of the valve and communicating also with this chamber 22 is a port 24, situated opposite the combined feed and exhaust ports 16. The said ports 23 and 24 of the valve are inlet-ports for feeding the propelling medium to the cylinders, and at the inner end of the valve and opposite the port 24 is an exhaust-port 25, that passes over the combined inlet and exhaust ports 16 of the casing and communicates with the interior of said valve 21. At the outer end of the valve-casing 17 is a cap 26, that closes the same and provides a bearing for the main shaft, it being also provided at one side with an exhaust-port 27 for the escape of the exhaust through the valve 21. The said valve is caused to rotate by the main shaft 13 and is capable of rotating a half-revolution with relation to said shaft for the purpose of reversing the motor. In the particular construction illustrated the said main shaft 13 extends centrally through the valve 21 and is provided with a projection or arm 28. The interior of the valve is provided with two faces 29 and 30, against which the arm or projection 28 contacts. For instance, as shown in Fig. 5, the face 30 is in contact with said projection 28, while by moving the valve in the direction shown by the arrow it will rotate half a revolution and bring the face 29 in contact with the other side of the arms or projections. It is obvious, of course, that this relative movement of the valve and shaft can be obtained without resorting to this particular construction shown and described, so long as the valve can be moved relatively to the shaft and in the opposite direction from which it is being rotated by said shaft in order to reverse the position of the feed and exhaust ports.

The particular means which I have shown for turning the valve a half-revolution consists of a lever 31, loosely mounted upon the hub at the end of the cap 26 and provided with a finger or detent 32, that extends through the slot 33 in the outer end of the valve 21, said valve being suitably notched, as shown at 34, to be engaged by the finger or detent. The said lever 31 is elastic and normally stands with the detent out of engagement with said teeth 34, a stop 35, adapted to engage the inner face of the outer end of the cap, serving to limit the outward movement of the spring-lever. It is obvious that by pressing the finger or detent 32 into engagement with the end of the valve and then rotating the lever upon the main shaft said valve can be turned the length of the slot 33 in the cap 26.

The operation is as follows: It is understood that there is a continuous supply of the propelling medium through the pipe 20, which maintains a pressure within the annular chamber 19, surrounding the inlet-ports 18 of the valve-casing. For the purpose of illustration I will assume that the pistons are in the position shown in Figs. 3 and 4 and that the valve is in the position shown in Fig. 8, the direction of rotation of the main shaft and valve being shown by arrows. In this position the lower cylinder 2 is feeding while the upper cylinder 4 is exhausting, while at this particular point the cylinder 3 is at the end of its exhaust and is about to feed and the cylinder 5 is at the end of its feed and is about to exhaust. The propelling medium is then entering the chamber 22 of the valve through the inlet-port 23 from the lower port 18 of the casing 17, while the exhaust from the upper cylinder 4 is passing into the interior of the valve through the upper port 16 of the casing 17 and out through the exhaust 27. As the valve rotates in the direction shown by the arrow in Fig. 8—for instance, to the position shown in Fig. 9—it is seen that the cylinder 3 has commenced to feed, while the cylinder 5 is exhausting.

To reverse the motor—for instance, from the position shown in Fig. 9—the motor is first stopped and the lever 31 engaged with the valve and turned a half-revolution, which brings it to the position shown in Fig. 10. This reverses the positions of the cylinders, so that cylinders 2 and 3, which were feeding, are now thrown into communication with the exhaust-port 25, while cylinders 4 and 5, which were exhausting, are thrown into communication with the port 24 from chamber 22 of the valve. It is seen from the foregoing description that at all times, except at the end of every quarter-revolution, when two of the pistons reverse their movement, there are two cylinders exhausting and two active, so as to impart an even and powerful action from the driving-shafts.

In Fig. 11 I have shown a valve-casing with three ports for the purpose of employing three instead of four cylinders. The three combined and exhaust ports of the valve-casing are indicated by 36 and correspond to the ports 16 of the valve-casing before described. The casing is indicated by 37, the valve by 38, the valve feed-port by 39, and the valve exhaust-port by 40.

Having thus described my invention, what I claim as new, and desire to secure by Letters Patent, is—

1. A motor having a plurality of cylinders provided with pistons connected with a common shaft, a valve-casing having a plurality of feed-ports communicating at all times with a common constant supply and a plurality of combined feed and exhaust ports communicating with said cylinders, a hollow valve in said casing rotatable with said shaft, said valve being also capable of a partial rotation relative to said shaft, teeth on said valve, a rotatable lever having a finger adapted to engage said teeth and rotate said valve, said valve being provided with a chamber, having a port communicating at all times with said feed-ports of the valve-casing, and a port communicating with said combined feed and exhaust ports, the latter ports of said chamber being of sufficient size to communicate at the same time with two of said combined feed and exhaust ports, and said valve being provided with an exhaust-chamber having a port communicating with said combined feed and exhaust ports and of sufficient size to communicate at the same time with two of said ports.

2. A motor having a plurality of cylinders provided with pistons connected with a common shaft, a valve-casing, a valve therein for controlling the feed and exhaust of said cylinders, means for causing said shaft and valve to rotate in unison, said valve being capable of a partial rotation relative to said shaft, teeth on said valve, and a lever pivotally mounted and adapted to engage said teeth and rotate said valve relative to said shaft.

3. A motor having a plurality of cylinders provided with pistons connected with a common shaft, a valve-casing, a valve therein for controlling the feed and exhaust of said cylinders, said valve having an annular projecting series of notches or teeth, means for causing said shaft and valve to rotate in unison, said valve being capable of a partial rotation relative to said shaft, and a lever pivotally mounted and having a finger normally out of engagement with said notches or teeth, said finger being adapted to be moved into engagement with said teeth so as to rotate said valve relative to said shaft.

4. In a motor, a shaft, a plurality of cylinders provided with pistons connected to said shaft, a valve-casing, a valve therein for controlling the flow of the motive fluid, an arm 28 on said shaft, faces 29 and 30 located within said valve, said faces being adapted to be in contact with said arm, and means for reversing said valve.

5. In a motor, a shaft, a plurality of cylinders provided with pistons connected to said shaft, a valve-casing, a valve therein for controlling the flow of the motive fluid, an arm on said shaft, faces 29 and 30 located within said valve, said faces being adapted to be in contact with said arm, teeth on said valve, a lever movably supported and means on said lever for engaging said teeth and actuating said valve.

HENRY T. VADERS.

Witnesses:
JOHN A. WIEDERSHEIM,
WM. CANER WIEDERSHEIM.